(12) United States Patent
Sheng

(10) Patent No.: US 6,694,574 B1
(45) Date of Patent: Feb. 24, 2004

(54) SNAP HOOK ASSEMBLY FOR A LUGGAGE

(76) Inventor: Wang King Sheng, No. 270, Dungshi 9$^{th}$ Rd., Daan Shiang, Taichuang County (TW)

( * ) Notice: Subject to any disclaimer, the term of this patent is extended or adjusted under 35 U.S.C. 154(b) by 0 days.

(21) Appl. No.: 10/354,814

(22) Filed: Jan. 29, 2003

(51) Int. Cl.$^7$ .................... A44B 13/02; B66C 1/34; F16B 45/02
(52) U.S. Cl. ............ 24/265 H; 24/598.4; 24/598.7; 24/599.1; 24/600.7; 24/600.9; 294/82.11
(58) Field of Search ................ 24/265 H, 598.5, 24/598.7, 598.1, 905, 68 CD, 595.1, 596.1, 599.1, 592.11, 599.5, 598.2, 600.4, 600.6, 600.7, 165, 597, 600.9, 592.1; 294/82.11; 119/776

(56) References Cited

U.S. PATENT DOCUMENTS

| | | | | | |
|---|---|---|---|---|---|
| 759,630 | A | * | 5/1904 | Page .................. | 24/600.4 |
| 1,200,540 | A | * | 10/1916 | Swedlund .............. | 24/905 |
| 4,577,374 | A | * | 3/1986 | Lii ..................... | 24/165 |
| 5,365,642 | A | * | 11/1994 | Rekuc et al. ........... | 24/600.9 |
| 6,030,015 | A | * | 2/2000 | Fujikawa et al. ....... | 294/82.11 |
| 6,557,219 | B2 | * | 5/2003 | Smith et al. ........... | 24/599.1 |

* cited by examiner

*Primary Examiner*—Victor Sakran
(74) *Attorney, Agent, or Firm*—Charles E. Baxley

(57) ABSTRACT

A snap hook assembly for a luggage includes a suspension member, and a hook member. The suspension member includes a first suspension block and a second suspension block. The hook member is mounted on the suspension member and includes a main body having an insertion pin and a hook. Thus, the first suspension block and the second suspension block are combined with each other rigidly and stably, thereby enhancing the structural strength of the snap hook assembly. In addition, when the hook member is subjected to a gravity load, the gravity load is evenly distributed on the first suspension block and the second suspension block, thereby increasing the lifetime of the snap hook assembly.

14 Claims, 3 Drawing Sheets

SNAP HOOK ASSEMBLY FOR A LUGGAGE

BACKGROUND OF THE INVENTION

1. Field of the Invention

The present invention relates to a snap hook assembly for a luggage, and more particularly to a snap hook assembly for a luggage, wherein the first suspension block and the second suspension block of the suspension member are combined with each other rigidly and stably, thereby enhancing the structural strength of the snap hook assembly.

2. Description of the Related Art

A conventional snap hook assembly for a luggage in accordance with the prior art shown in FIGS. 1 and 2 comprises a suspension member 20, a hook member 10, and a locking member 22.

The suspension member 20 is formed with a receiving recess 27 and two protruding stubs 23. The hook member 10 has an upper end formed with a protrusion 11 and a pin 12 mounted in the receiving recess 27 and a lower end formed with a hook 15. A catch key 14 is pivotally mounted on the hook member 10 by a fixing pin 18 which is extended through a through hole 13 of the hook member 10. A torsion spring 16 is mounted in a receiving space of the hook member 10 and urged between the hook member 10 and the catch key 14. The locking member 22 is secured on the suspension member 20 and rested on the hook member 10, for securing the hook member 10 on the suspension member 20. The locking member 22 is formed with two through holes 25 combined with the two protruding stubs 23. Each of the suspension member 20 and the locking member 22 has a periphery formed with a lug 28.

However, when the hook member 10 is subjected to a gravity load, all of the gravity load is concentrated on the protruding stubs 23 of the suspension member 20, so that the protruding stubs 23 of the suspension member 20 are easily broken during a long-term utilization, thereby wearing the whole conventional snap hook assembly, and thereby decreasing the lifetime thereof. In addition, the receiving recess 27 has a dimension greater than that of the protrusion 11 and the pin 12, so that the locking member 22 is combined with the suspension member 20 rigidly. In such a manner, the hook member 10 is loosely mounted between the locking member 22 and the suspension member 20, so that the hook member 10 easily sways or oscillate, thereby causing inconvenience in use.

SUMMARY OF THE INVENTION

The present invention is to mitigate and/or obviate the disadvantage of the conventional snap hook assembly for a luggage.

The primary objective of the present invention is to provide a snap hook assembly for a luggage, wherein the first suspension block and the second suspension block of the suspension member are combined with each other rigidly and stably, thereby enhancing the structural strength of the snap hook assembly.

Another objective of the present invention is to provide a snap hook assembly for a luggage, wherein the first suspension block and the second suspension block are symmetric with each other, so that when the hook member is subjected to a gravity load, the gravity load is evenly distributed on the first suspension block and the second suspension block, thereby increasing the lifetime of the snap hook assembly.

A further objective of the present invention is to provide a snap hook assembly for a luggage, wherein the receiving chamber of the suspension member has a dimension flush with the hook member, so that the first protrusion and the second protrusion of the hook member are respectively secured on the first reinforcement rib and the second reinforcement rib of the suspension member rigidly and stably, and the hook member is supported by the suspension member rigidly and stably without movement or vibration.

A further objective of the present invention is to provide a snap hook assembly for a luggage, wherein the first protrusion and the second protrusion of the hook member are circular, so that the hook member can be rotated relative to the suspension member.

A further objective of the present invention is to provide a snap hook assembly for a luggage, wherein the catch key has an outer periphery formed with an anti-skid rib, thereby facilitating the user pushing the catch key.

In accordance with the present invention, there is provided a snap hook assembly for a luggage, comprising a suspension member, and a hook member, wherein:

the suspension member includes a first suspension block and a second suspension block combined with each other, each of the first suspension block and the second suspension block has a lower end formed with a receiving chamber, the receiving chamber of each of the first suspension block and the second suspension block has an inner wall formed with a first reinforcement rib and a second reinforcement rib; and the hook member is mounted on the suspension member and includes a main body having an upper end formed with an insertion pin mounted in the receiving chamber of the suspension member and a lower end formed with a hook protruding outward from the receiving chamber of the suspension member, the insertion pin is formed with a first protrusion secured on the first reinforcement rib of the suspension member and a second protrusion secured on the second reinforcement rib of the suspension member.

Further benefits and advantages of the present invention will become apparent after a careful reading of the detailed description with appropriate reference to the accompanying drawings.

DETAILED DESCRIPTION OF THE INVENTION

Figure 3:
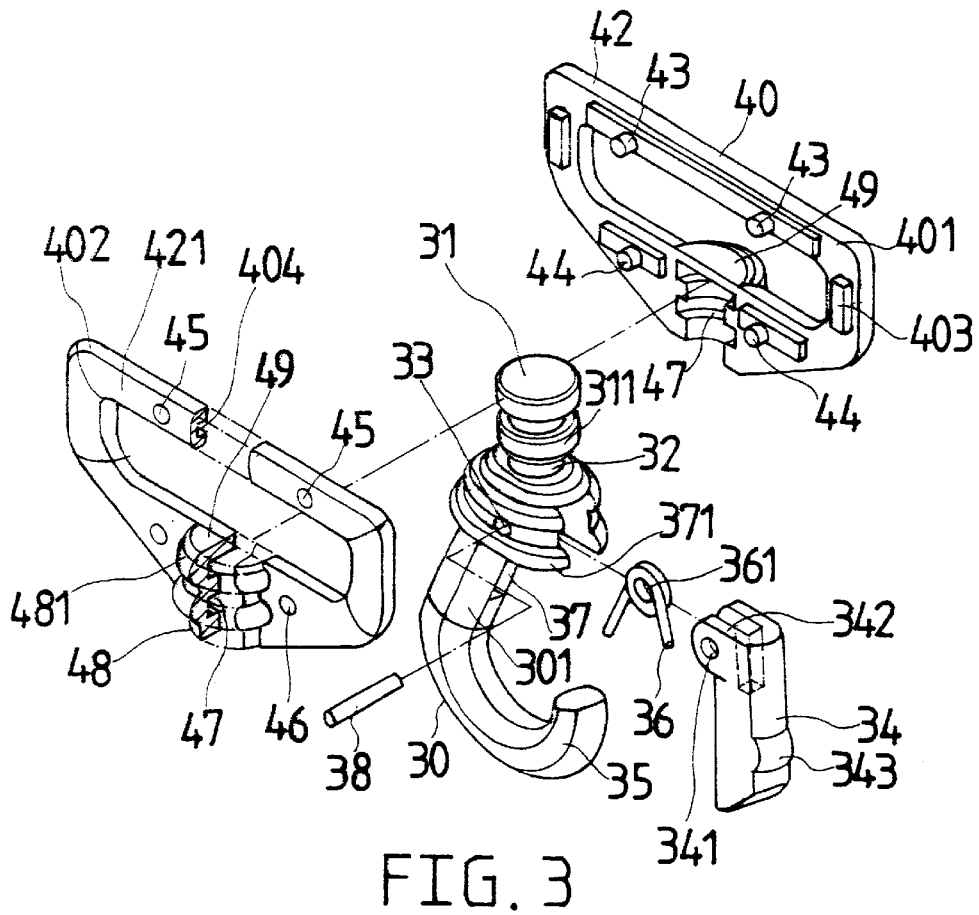
FIG. 3 is an exploded perspective view of a snap hook assembly for a luggage in accordance with a first embodiment of the present invention.
Figure 4:
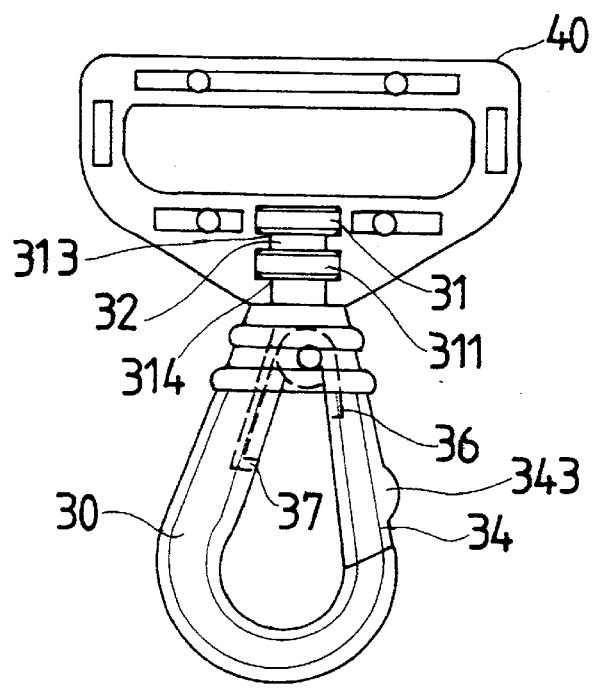
FIG. 4 is a front plan assembly view of the snap hook assembly for a luggage as shown in FIG. 3.

Referring to the drawings and initially to FIGS. 3 and 4, a snap hook assembly for a luggage in accordance with a first embodiment of the present invention comprises a suspension member 40, and a hook member 30.

The suspension member 40 includes a first suspension block 401 and a second suspension block 402 combined with each other. Preferably, the first suspension block 401 and the second suspension block 402 are symmetric with each other. Each of the first suspension block 401 and the second suspension block 402 has a lower end formed with a receiving chamber 47. The receiving chamber 47 of each of the first suspension block 401 and the second suspension block 402 has an inner wall formed, with a circular first reinforcement rib 48 and a circular second reinforcement rib 481. The receiving chamber 47 of each of the first suspension block 401 and the second suspension block 402 has a closed top wall 49.

The second suspension block 402 has a periphery formed with a plurality of grooves 404, and the first suspension block 401 has a periphery formed with a plurality of protruding blocks 403 each inserted into a respective one of the grooves 404 of the second suspension block 402.

The second suspension block 402 has a suspension shank 421 formed with two first through holes 45, and the first suspension block 401 has a suspension shank 42 formed with two first protruding stubs 43 each inserted into a respective one of the two first through holes 45 of the second suspension block 402.

The lower end of the second suspension block 402 is formed with two second through holes 46, and the lower end of the first suspension block 401 is formed with two second protruding stubs 44 each inserted into a respective one of the two second through holes 46 of the second suspension block 402.

The hook member 30 is mounted on the suspension member 40 and includes a main body 301 having an upper end formed with an insertion pin 32 mounted in the receiving chamber 47 of the suspension member 40 and a lower end formed with a hook 35 protruding outward from the receiving chamber 47 of the suspension member 40.

The insertion pin 32 is formed with a circular first protrusion 311 secured on the first reinforcement rib 48 of the suspension member 40 and a circular second protrusion 31 secured on the second reinforcement rib 481 of the suspension member 40. Preferably, the receiving chamber 47 of the suspension member 40 has a dimension flush with the first protrusion 311 and the second protrusion 31 of the hook member 30.

The hook member 30 further includes a catch key 34 pivotally mounted on the main body 301 and mating with the hook 35, and a torsion spring 36 mounted between the catch key 34 and the main body 301. The catch key 34 has an outer periphery formed with an anti-skid rib 343.

The insertion pin 32 is formed with a receiving space 37, the catch key 34 has a forked upper end 342 pivotally mounted in the receiving space 37, and the torsion spring 36 is mounted on the forked upper end 342 of the catch key 34.

The receiving space 37 of the insertion pin 32 has a wall 371 formed with a pivot hole 33, the forked upper end 342 of the catch key 34 is formed with a through hole 341, the torsion spring 36 is formed with a shaft hole 361, and the hook member 30 further includes a fixing bolt 38 in turn extended through the pivot hole 33 of the insertion pin 32, the through hole 341 of the catch key 34 and the shaft hole 361 of the torsion spring 36, so that the catch key 34 is pivotally mounted on the main body 301.

Figure 5:
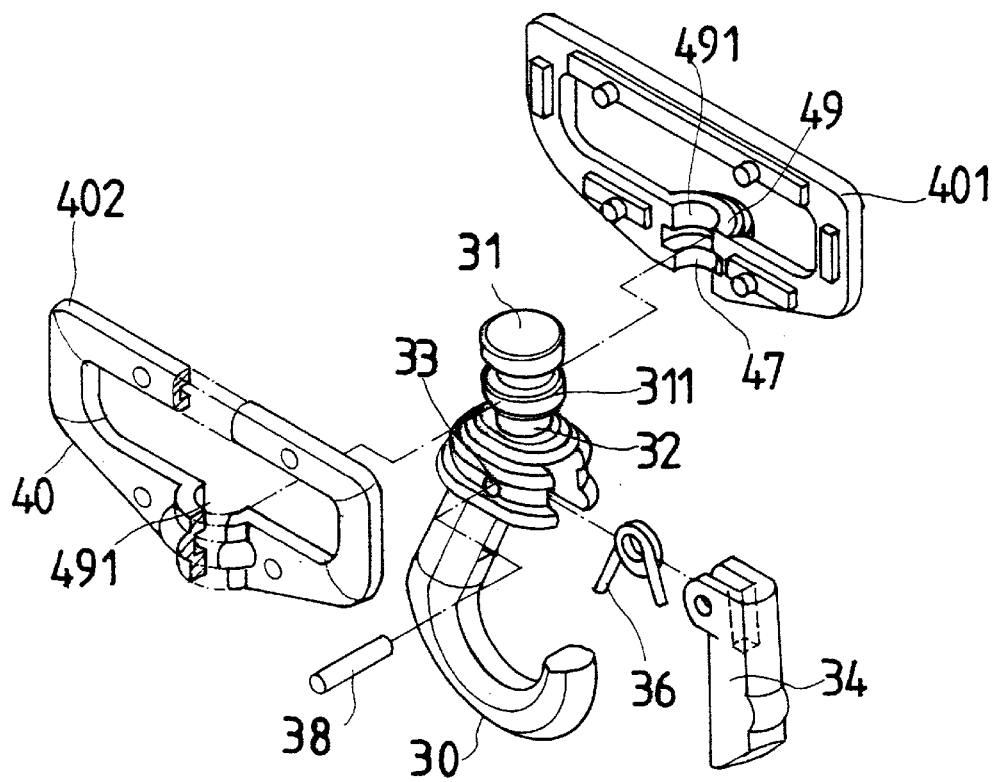
FIG. 5 is an exploded perspective view of a snap hook assembly for a luggage in accordance with a second embodiment of the present invention.
Figure 6:
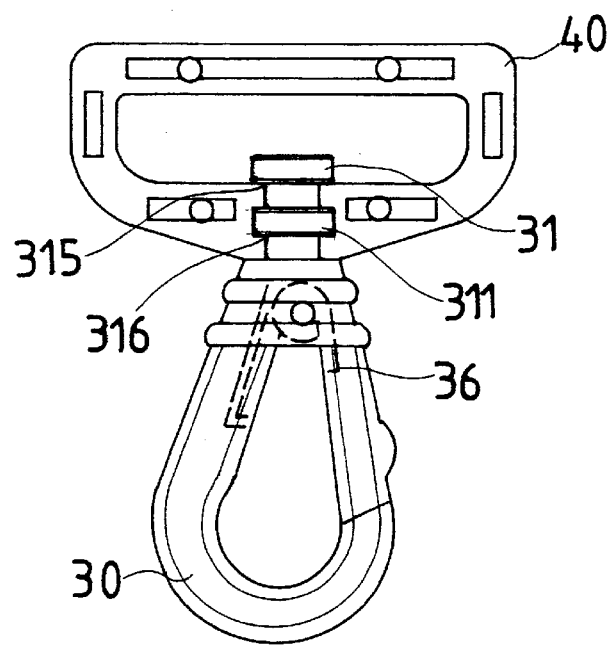
FIG. 6 is a front plan assembly view of the snap hook assembly for a luggage as shown in FIG. 5.

Referring to FIGS. 5 and 6, the snap hook assembly for a luggage in accordance with the second embodiment of the present invention is shown, wherein the top wall 49 of the receiving chamber 47 of each of the first suspension block 401 and the second suspension block 402 is formed with a through hole 491. The through hole 491 has a diameter greater than that of the insertion pin 32 and smaller than that of the first protrusion 311 and the second protrusion 31. Thus, the second protrusion 31 is rested on and protruded outward from the top wall 49 of the receiving chamber 47 as shown in FIG. 6.

Figure 1:
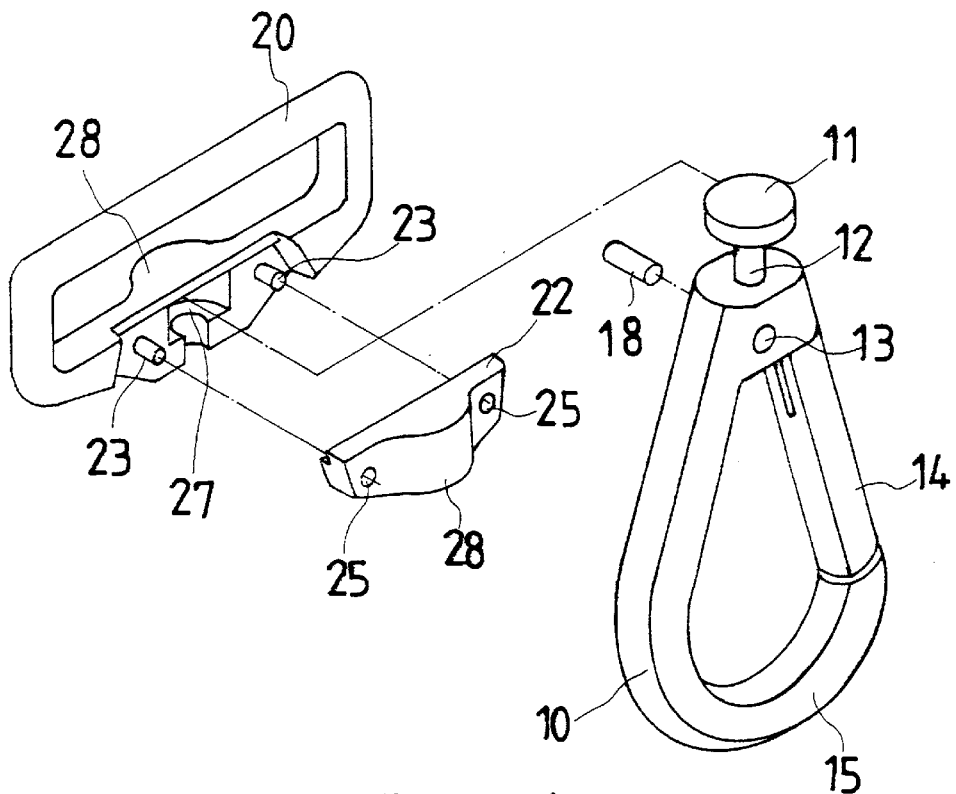
FIG. 1 is an exploded perspective view of a conventional snap hook assembly for a luggage in accordance with the prior art.
Figure 2:
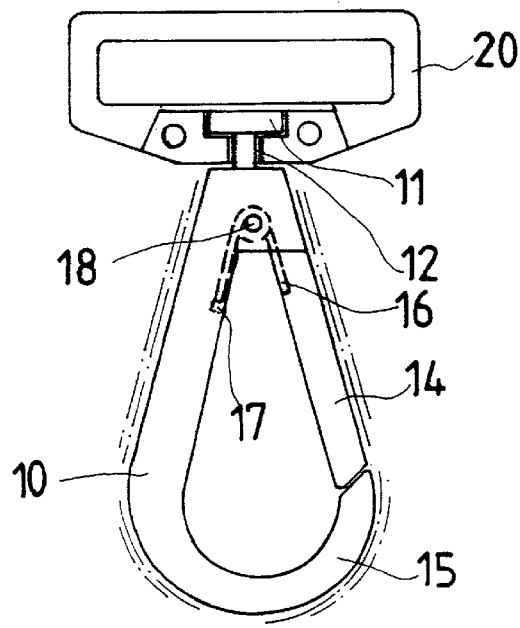
FIG. 2 is a front plan assembly view of the conventional snap hook assembly for a luggage as shown in FIG. 1.

In comparison, in the conventional snap hook assembly for a luggage in accordance with the prior art shown in FIGS. 1 and 2, when the hook member 10 is subjected to a gravity load, all of the gravity load is concentrated on the protruding stubs 23 of the suspension member 20, so that the protruding stubs 23 of the suspension member 20 are easily broken during a long-term utilization, thereby wearing the whole conventional snap hook assembly, and thereby decreasing the lifetime thereof. In addition, the receiving recess 27 has a dimension greater than that of the protrusion 11 and the pin 12, so that the locking member 22 is combined with the suspension member 20 rigidly. In such a manner, the hook member 10 is loosely mounted between the locking member 22 and the suspension member 20, so that the hook member 10 easily sways or oscillate, thereby causing inconvenience in use.

On the other hand, in the snap hook assembly for a luggage in accordance with the present invention shown in FIGS. 3 and 4, the suspension member 40 has a plurality of protruding blocks 403 each inserted into a respective one of the grooves 404, two first protruding stubs 43 each inserted into a respective one of the two first through holes 45, and two second protruding stubs 44 each inserted into a respective one of the two second through holes 46, so that the first suspension block 401 and the second suspension block 402 are combined with each other rigidly and stably, thereby enhancing the structural strength of the snap hook assembly.

In addition, the first suspension block 401 and the second suspension block 402 are symmetric with each other, so that when the hook member 30 is subjected to a gravity load, the gravity load is evenly distributed on the first suspension block 401 and the second suspension block 402, thereby increasing the lifetime of the snap hook assembly.

Further, the receiving chamber 47 of the suspension member 40 has a dimension flush with the first protrusion 311 and the second protrusion 31 of the hook member 30, so that the first protrusion 311 and the second protrusion 31 of the hook member 30 are respectively secured on the first reinforcement rib 48 and the second reinforcement rib 481 of the suspension member 40 rigidly and stably, thereby forming two support positions 314 and 313 shown in FIG. 4 (or two support positions 316 and 315 shown in FIG. 6), so that the hook member 30 is supported by the suspension member 40 rigidly and stably without movement or vibration.

Further, the first protrusion 311 and the second protrusion 31 of the hook member 30 are circular, so that the hook member 30 can be rotated relative to the suspension member 40.

Further, the catch key 34 has an outer periphery formed with an anti-skid rib 343, thereby facilitating the user pushing the catch key 34.

While the preferred embodiment(s) of the present invention has been shown and described, it will be apparent to those skilled in the art that various modifications may be made in the embodiment(s) without departing from the spirit of the present invention. Such modifications are all within the scope of the present invention.

What is claimed is:

1. A snap hook assembly for a luggage, comprising a suspension member, and a hook member, wherein:

the suspension member includes a first suspension block and a second suspension block combined with each other, each of the first suspension block and the second suspension block has a lower end formed with a receiving chamber, the receiving chamber of each of the first suspension block and the second suspension block has an inner wall formed with a first reinforcement rib and a second reinforcement rib; and the hook member is mounted on the suspension member and includes a main body having an upper end formed with an insertion pin mounted in the receiving chamber of the suspension member and a lower end formed with a hook protruding outward from the receiving chamber of the suspension member, the insertion pin is formed with a first protrusion secured on the first reinforcement rib of the suspension member and a second protrusion secured on the second reinforcement rib of the suspension member.

2. The snap hook assembly for a luggage in accordance with claim 1, wherein the first suspension block and the second suspension block are symmetric with each other.

3. The snap hook assembly for a luggage in accordance with claim 1, wherein the receiving chamber of each of the first suspension block and the second suspension block has a closed top wall.

4. The snap hook assembly for a luggage in accordance with claim 1, wherein the first protrusion and the second protrusion of the hook member are circular.

5. The snap hook assembly for a luggage in accordance with claim 1, wherein the second suspension block has a periphery formed with a plurality of grooves, and the first suspension block has a periphery formed with a plurality of protruding blocks each inserted into a respective one of the grooves of the second suspension block.

6. The snap hook assembly for a luggage in accordance with claim 1, wherein the second suspension block has a suspension shank formed with two first through holes, and the first suspension block has a suspension shank formed with two first protruding stubs each inserted into a respective one of the two first through holes of the second suspension block.

7. The snap hook assembly for a luggage in accordance with claim 1, wherein the lower end of the second suspension block is formed with two second through holes, and the lower end of the first suspension block is formed with two second protruding stubs each inserted into a respective one of the two second through holes of the second suspension block.

8. The snap hook assembly for a luggage in accordance with claim 1, wherein the receiving chamber of the suspension member has a dimension flush with the first protrusion and the second protrusion of the hook member.

9. The snap hook assembly for a luggage in accordance with claim 1, wherein the hook member further includes a catch key pivotally mounted on the main body and mating with the hook, and a torsion spring mounted between the catch key and the main body.

10. The snap hook assembly for a luggage in accordance with claim 9, wherein the catch key has an outer periphery formed with an anti-skid rib.

11. The snap hook assembly for a luggage in accordance with claim 9, wherein the insertion pin is formed with a receiving space, the catch key has a forked upper end pivotally mounted in the receiving space, and the torsion spring is mounted on the forked upper end of the catch key.

12. The snap hook assembly for a luggage in accordance with claim 11, wherein the receiving space of the insertion pin has a wall formed with a pivot hole, the forked upper end of the catch key is formed with a through hole, the torsion spring is formed with a shaft hole, and the hook member further includes a fixing bolt in turn extended through the pivot hole of the insertion pin, the through hole of the catch key and the shaft hole of the torsion spring, so that the catch key is pivotally mounted on the main body.

13. The snap hook assembly for a luggage in accordance with claim 1, wherein the top wall of the receiving chamber of each of the first suspension block and the second suspension block is formed with a through hole for securing the first protrusion of the hook member.

14. The snap hook assembly for a luggage in accordance with claim 13, wherein the through hole has a diameter greater than that of the insertion pin and smaller than that of the first protrusion and the second protrusion.

* * * * *